United States Patent
Brown

(10) Patent No.: US 9,876,247 B2
(45) Date of Patent: Jan. 23, 2018

(54) SOLID CERAMIC ELECTROLYTES

(71) Applicant: Jacqueline Leslie Brown, Lindley, NY (US)

(72) Inventor: Jacqueline Leslie Brown, Lindley, NY (US)

(73) Assignee: Corning Incorporated, Corning, NY (US)

( * ) Notice: Subject to any disclaimer, the term of this patent is extended or adjusted under 35 U.S.C. 154(b) by 22 days.

(21) Appl. No.: 13/677,654

(22) Filed: Nov. 15, 2012

(65) Prior Publication Data

US 2014/0134504 A1    May 15, 2014

(51) Int. Cl.
*H01M 8/1016* (2016.01)
*H01M 8/1004* (2016.01)
(Continued)

(52) U.S. Cl.
CPC ......... *H01M 8/1016* (2013.01); *C04B 35/447* (2013.01); *C04B 35/6261* (2013.01); *C04B 35/62645* (2013.01); *C04B 35/64* (2013.01); *H01M 8/1004* (2013.01); *H01M 12/06* (2013.01); *C04B 2235/3203* (2013.01); *C04B 2235/3206* (2013.01); *C04B 2235/3217* (2013.01); *C04B 2235/3232* (2013.01); *C04B 2235/3409* (2013.01); *C04B 2235/443* (2013.01); *C04B 2235/6025* (2013.01); *C04B 2235/786* (2013.01); *C04B 2235/81* (2013.01); *H01M 4/36* (2013.01); *H01M 4/38* (2013.01); *H01M 4/48* (2013.01); *H01M 4/92* (2013.01); *H01M 6/04* (2013.01); *H01M 6/14* (2013.01);
(Continued)

(58) Field of Classification Search
CPC ............... H01M 6/18; H01M 10/0525; H01M 10/0562; H01M 8/1016; H01M 8/124; H01M 8/1004; H01M 8/10; H01M 8/12; H01M 6/14; H01M 6/16; H01M 6/04; H01M 4/38; H01M 4/48; H01M 4/36; H01M 4/92; H01M 12/06
USPC ............... 429/188–189, 301–347, 199–207, 429/479–497
See application file for complete search history.

(56) References Cited

U.S. PATENT DOCUMENTS

| 8,206,852 B2 | 6/2012 | Chang ............ 429/231.95 |
| 2003/0006139 A1* | 1/2003 | Noda ............ G01N 27/4073 204/424 |

(Continued)

FOREIGN PATENT DOCUMENTS

| EP | 2 211 404 | 7/2010 | |
| JP | 2001-093536 | * 4/2001 | ............ H01M 6/18 |

OTHER PUBLICATIONS

English Translation of JP2001-093536.*
(Continued)

*Primary Examiner* — Milton I Cano
*Assistant Examiner* — Kiran Akhtar
(74) *Attorney, Agent, or Firm* — John L. Haack

(57) ABSTRACT

A solid ceramic electrolyte may include an ion-conducting ceramic and at least one grain growth inhibitor. The ion-conducting ceramic may be a lithium metal phosphate or a derivative thereof. The grain growth inhibitor may be magnesia, titania, or both. The solid ceramic electrolyte may have an average grain size of less than about 2 microns. The grain growth inhibitor may be between about 0.5 mol. % to about 10 mol. % of the solid ceramic electrolyte.

19 Claims, 2 Drawing Sheets

(51) Int. Cl.

| | |
|---|---|
| *C04B 35/447* | (2006.01) |
| *H01M 12/06* | (2006.01) |
| *C04B 35/626* | (2006.01) |
| *C04B 35/64* | (2006.01) |
| *H01M 6/14* | (2006.01) |
| *H01M 6/04* | (2006.01) |
| *H01M 4/92* | (2006.01) |
| *H01M 4/38* | (2006.01) |
| *H01M 4/36* | (2006.01) |
| *H01M 6/18* | (2006.01) |
| *H01M 8/12* | (2016.01) |
| *H01M 4/48* | (2010.01) |
| *H01M 6/16* | (2006.01) |
| *H01M 8/10* | (2016.01) |
| *H01M 8/124* | (2016.01) |
| *H01M 10/0525* | (2010.01) |
| *H01M 10/0562* | (2010.01) |

(52) U.S. Cl.
CPC ............... *H01M 6/16* (2013.01); *H01M 6/18* (2013.01); *H01M 8/10* (2013.01); *H01M 8/12* (2013.01); *H01M 8/124* (2013.01); *H01M 10/0525* (2013.01); *H01M 10/0562* (2013.01); *H01M 2300/0068* (2013.01); *Y02P 70/56* (2015.11)

(56) References Cited

U.S. PATENT DOCUMENTS

| | | | |
|---|---|---|---|
| 2003/0165726 A1 | 9/2003 | Robert et al. | 429/33 |
| 2006/0220280 A1 | 10/2006 | Sutaria et al. | 264/640 |
| 2008/0161746 A1* | 7/2008 | Visco | A61K 33/00 604/20 |
| 2009/0108507 A1 | 4/2009 | Messing et al. | 264/605 |
| 2009/0317724 A1* | 12/2009 | Kumar | H01M 10/056 429/320 |
| 2012/0141916 A1 | 6/2012 | Robert et al. | 429/495 |
| 2013/0137010 A1 | 5/2013 | Aitken et al. | 429/486 |

OTHER PUBLICATIONS

J. Ma, et al., "Composition Optimization of Zirconia Toughened Alumina for Dental Ceramics", *Key Engineering Materials*, 2007, vols. 330-332, pp. 1369-1372.

W. Si-qian, et al., "Influence of MgO and TiO2 on mechanical properties of zirconia toughened alumina ceramics formed by gel-casting techniques", *West China Journal of Stomatology*, 2009, vol. 27, No. 3, pp. 335-343.

H. Aono, et al., Electrical property and sinterability of LiTi2 (PO4)3 mixed with lithium salt (LiPO4 or Li3BO3), *Solid State Ionics*, 1991, vol. 47, pp. 257-264.

Serial No. PCT/US2013/070288, International Search Report, dated Feb. 10, 2014.

\* cited by examiner

SOLID CERAMIC ELECTROLYTES

BACKGROUND

Field

The present disclosure relates generally to electrolytes, and more specifically to solid ceramic electrolytes that may be used in electrochemical devices.

Technical Background

Solid electrolytes, also known as fast ion conductors, are materials that can function as solid state ion conductors and can be used in electrochemical devices such as, for example, solid oxide fuel cells and lithium-air batteries. In a lithium-air battery, for instance, lithium ions move from a negative electrode (anode) to a positive electrode (cathode) during discharge (and back when charging) via the solid electrolyte. In some solid electrolytes, such as lithium metal phosphates, lithium ions can be conducted through vacancies in the electrolyte crystal lattice. Additionally, the solid electrolyte can provide a hermetic barrier between the anode and the cathode in order to prevent the anode and cathode from sharing a common electrolyte solution.

Important to the development of various electrochemical devices is the availability of solid, conductive electrolyte materials. A major challenge for such electrolyte materials is the ability to sinter suitable materials to sufficient density such that the electrolyte is hermetic while providing sufficient conductivity and economy, as well as acceptable physical stability. Conventional hermetic electrolytes, which are commonly made using a glass-ceramic process, can be made dense and hermetic, but these attributes typically come at the expense of poor conductivity and high cost. A further challenge facing the conventional glass-ceramic process is the requirement that the desired composition form a stable glass.

In view of the foregoing, it would be desirable to develop an economical, ion-conductive, and mechanically-robust solid ceramic electrolyte for use in electrochemical devices.

BRIEF SUMMARY

The concepts of the present disclosure are generally applicable to solid ceramic electrolytes for use in electrochemical devices. In accordance with one embodiment, a solid ceramic electrolyte may comprise an ion-conducting ceramic and at least one grain growth inhibitor. The ion-conducting ceramic may comprise a lithium metal phosphate or a derivative thereof and the grain growth inhibitor may comprise magnesia or a precursor thereof, titania or a precursor thereof, or both. The solid ceramic electrolyte may have an average grain size of less than about 2 microns. The grain growth inhibitor may comprise between about 0.5 mol. % to about 10 mol. % of the solid ceramic electrolyte.

In accordance with another embodiment, a solid ceramic electrolyte may be formed by a method comprising combining an ion-conducting ceramic with at least one grain growth inhibitor to form a mixture, casting the mixture to form a body, and sintering the body to form the solid ceramic electrolyte.

An electrochemical device may comprise a negative electrode, a positive electrode, and an interposed electrolyte material. The electrolyte that is incorporated into such a device may comprise a solid ceramic electrolyte as disclosed herein.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
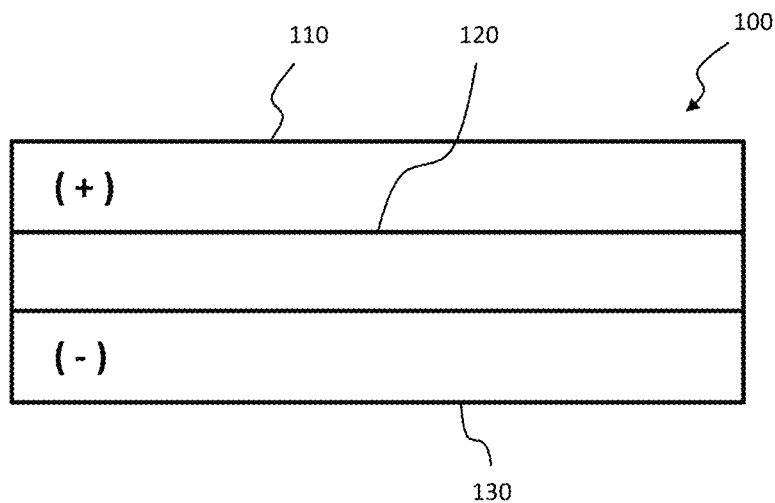
FIG. 1 is a schematic diagram of an electrochemical device including a solid ceramic electrolyte as described herein.

Reference will now be made in greater detail to various embodiments of the present disclosure, some embodiments of which are illustrated in the accompanying drawings. Whenever possible, the same reference numerals will be used throughout the drawings to refer to the same or similar parts.

The solid ceramic electrolytes described herein may generally comprise an ion-conducting ceramic and at least one grain growth inhibitor. During sintering, the presence of the grain growth inhibitor may aid in producing a solid ceramic electrolyte with a fine-grain, granular structure. A fine-grain granular structure, such as a structure having grains that on average are less than about 2 microns, may have increased mechanical stability. The solid ceramic electrolytes described herein may be useful in electrochemical devices, and particularly useful in lithium-air batteries.

In various embodiments, a solid ceramic electrolyte may comprise an ion-conducting ceramic (e.g., lithium ion-conducting ceramic) such as a lithium metal phosphate or a derivative thereof. An example lithium metal phosphate is lithium aluminum titanium phosphate (LATP). A composition of LATP, in some embodiments, may be represented by the chemical formula $Li_{1+x}Al_xTi_{2-x}(PO_4)_3$, where x is between 0 and 0.6. One such composition is $Li_{1.4}Al_{0.4}Ti_{1.6}(PO_4)_3$.

LATP may be produced in a solid state process. For example, ammonium phosphate, aluminum oxide, titanium oxide, and lithium carbonate powders may be combined in a stoichiometric ratio to produce LATP. The foregoing precursor materials may be combined with a suitable grain growth inhibitor to form a mixture that can be tape cast and sintered to form a dense membrane.

The grain growth inhibitor may be a refractory material, meaning that the grain growth inhibitor is resistant to a heat treatment. In embodiments, the grain growth inhibitor is not liberated from the solid ceramic electrolyte during sintering. Rather, the grain growth inhibitor, as referred to herein, remains in the solid ceramic electrolyte following sintering. In related embodiments, however, precursors of a grain growth inhibitor may be used which through sintering are converted into the grain growth inhibitor that remains in the post-sintered solid ceramic electrolyte.

In one embodiment, the grain growth inhibitor may comprise magnesia, titania, or both. For example, the grain growth inhibitor may comprise magnesia and titania. In another embodiment, the grain growth inhibitor comprises magnesia, but is substantially free of titania. In another embodiment, the grain growth inhibitor comprises titania, but is substantially free of magnesia. Precursors of magnesia and titania may be converted into magnesia and titania, respectively. Without limitation, suitable precursors of magnesia, for example, include magnesium nitrate and magnesium acetate.

If the grain growth inhibitor comprises both titania and magnesia, the molar ratio of titania to magnesia (titania: magnesia) may be between about 2:1 to about 8:1 (i.e., the ratio of titania to magnesia may be about 2:1, 3:1, 4:1, 5:1, 6:1, 7:1 or 8:1, or may be a range between any of the titania to magnesia ratios disclosed).

A method of forming the solid ceramic electrolyte generally may comprise combining the ion-conducting ceramic with the grain growth inhibitor to form a mixture, casting the mixture to form a body, and sintering the body to form the solid ceramic electrolyte. To form the mixture comprising the ion-conducting ceramic and the grain growth inhibitor, prior to mixing the ion-conducting ceramic with the grain growth inhibitor, the ion-conducting ceramic may be milled to an average particle size of less than about 1 micron (e.g., less than 1, 0.5, 0.2, 0.1 or 0.05 microns). As used herein, a "particle size" or "grain size" refers to the maximum length of the particle or grain in its longest dimension.

The milled ion-conducting ceramic may be combined with the grain growth inhibitor to form the mixture comprising the ion-conducting ceramic and the grain growth inhibitor. The grain growth inhibitor may be in a powder form, and in some embodiments may have a similar average particle size as the milled ion-conducting ceramic. In other embodiments, the average particle size of the grain growth inhibitor may be in the range of between about 50 nm and about 300 nm, such as 50 nm, 100 nm, 150 nm, 200 nm, 250 nm, or 300, nm, or in a range between any disclosed particle sizes.

The grain growth inhibitor may be present in an amount sufficient to enable formation of the fine-grain granular structure at sintering temperatures. In one embodiment, the grain growth inhibitor may comprise between about 0.5 mol. % to about 10 mol. % of the solid ceramic electrolyte. In other embodiments, the grain growth inhibitor may comprise about 0.5, 0.6, 1, 2, 3, 4, 5, 6, 7, 8, 9 or 10 mol. % of the solid ceramic electrolyte (or a range between any two of the mol. % disclosed herein). In one exemplary embodiment, grain growth inhibitor may comprise between about 3 mol. % and 6 mol. % of the solid ceramic electrolyte.

Following the formation of the ion-conducting ceramic/grain growth inhibitor mixture, the mixture may be cast to form a body that may be sintered. In one embodiment, the casting comprises tape casting. In a tape casting process, the ion-conducting ceramic/grain growth inhibitor mixture (optionally comprising milled powders) may be incorporated into a tape casting slip with suitable binders, plasticizers, or both, cast to a tape, dried, cut, and released prior to sintering. One or more binders and/or plasticizers may be dissolved into the ion-conducting ceramic/grain growth inhibitor mixture to make a tape casting slip. In various embodiments, a tape casting slip may optionally include one or both of a binder and a plasticizer, such as various polymers.

Following the formation of the cast body, the cast body may be sintered to form the solid ceramic electrolyte. As used herein, "sintering" refers to any process wherein a material is coalesced into a solid or porous mass by heating it and/or compressing it. A sintering process generally does not involve the liquefaction of the material being sintered. In one embodiment, the sintering may be performed at a temperature of equal to or less than about 950° C. (e.g., less than about 950° C., 925, 900, 875 or 850° C., or in a range between any two maximum sintering temperatures disclosed). It may be desirable to sinter at lower temperatures, because sintering at temperatures above about 950° C. may be more difficult to control in an industrial process and/or may require special equipment that may be more expensive than conventional furnaces or kilns. During the sintering, the binders, plasticizers, or both, may be liberated from the solid ceramic electrolyte due to the temperatures of the sintering process. However, at least a portion or substantially all of the grain growth inhibitor may remain in the solid ceramic electrolyte.

In some embodiments, the sintering may result in a solid ceramic electrolyte membrane having a thickness of less than 200 microns (e.g., less than 200, 150, 100 or 50 microns, or in a range between any two maximum thicknesses disclosed). In combination with any of the disclosed thicknesses, the solid ceramic electrolyte may have a maximum lateral dimension of between about 0.5 cm about 1 meter, such as any size suitable for use in an electrochemical device, such as a device arranged in a stacked configuration.

The resulting material, following sintering, may be a solid ceramic electrolyte which has fine-grain granular structure, is hermetic, is physically stable when in contact with an aqueous solution, and is conductive to ions (e.g., lithium ions). As used herein, a hermetic material is substantially impervious to the diffusion of liquids or gasses. The solid ceramic electrolyte may be fully dense or have a density that is at least 95% (e.g., at least 95, 96, 97, 98, 99, 99.9 or 99.99%) of its maximum (e.g., theoretical) density. In some embodiments, the ion conductivity of the solid ceramic electrolyte is greater than $1.0 \times 10^{-4}$ S/cm (e.g., greater than $1 \times 10^{-4}$, $1.5 \times 10^{-4}$, $2.0 \times 10^{-4}$, $2.5 \times 10^{-4}$, $3.0 \times 10^{-4}$, $3.5 \times 10^{-4}$, or $4.0 \times 10^{-5}$ S/cm, or a range between any two of the minimum conductivities disclosed herein).

In some embodiments, the solid ceramic electrolyte may have a fine-grain granular structure, which may impart increased mechanical stability to the membrane. In various embodiments, the average grain size of the solid ceramic electrolyte may be less than 2 microns, e.g., less than 2, 1.8, 1.6, 1.4, 1.2, 1.0, 0.8 or 0.6 microns, or within a range between any two of the maximum average grain sizes disclosed herein.

In embodiments, the solid electrolyte materials disclosed herein do not contain glassy phases nor are they glass-ceramic materials that may develop a relatively large grain size during sintering. Additionally, the absence of glass or glass-ceramic materials in the solid ceramic electrolyte may increase conductivity, as glass and glass-ceramic materials generally do not have good conductivity and reduce the conductivity of a solid ceramic electrolyte.

It will be appreciated that LATP is subject to microcracking as a result of a large thermal expansion anisotropy. A critical grain size for microcracking is estimated to be about 2 μm.

The solid ceramic electrolytes described herein may be useful in electrochemical devices, and particularly useful in lithium-air batteries. Referring to FIG. 1, an electrochemical device 100 may comprise a negative electrode 130, a positive electrode 110, and interposed solid electrolyte material 120. The solid ceramic electrolytes described herein may serve as the electrolyte material 120 in the electrochemical device 100. The electrochemical device 100 may be any electrochemical device capable of creating a current. Such contemplated electrochemical devices include lithium-air batteries, lithium-ion batteries, sodium sulfur batteries, solid oxide fuel cells, oxygen separators, electrolyzers, sensors, chemical reactors, etc.

In one embodiment, the solid ceramic electrolyte is a membrane with a thickness of less than about 200 microns (e.g., less than 200, 150, 100 or 50 microns, or in a range between any two maximum thicknesses disclosed). The solid ceramic electrolytes described herein may be substantially free of an electrolytic solution. In one exemplary embodiment, the electrochemical device is a lithium air battery. The properties of the solid ceramic electrolyte described herein, particularly the properties of mechanical stability, hermeticity, physical stability when in contact with an aqueous solution, and conductivity, may be particularly desirable for the application of an electrolyte in a lithium-air battery.

In some embodiments, the solid ceramic electrolyte may be physically stable when in contact with an aqueous solution for at least about 48 hours. In other embodiments, the solid ceramic electrolyte may be physically stable when in contact with an aqueous solution for at least about 48 hours, about 100 hours, about 200 hours, about 500 hours, about 1000 hours, about 3000 hours, about 6000 hours, about 1 year, or about 2 years, or in a range between any two times disclosed. As described herein, a solid ceramic electrolyte is physically stable when in contact with an aqueous solution if it does not exhibit mechanical failure when contacted on one side of a 200 nm or less thick membrane with 1M ammonium chloride. A detailed description of the experimental setup for such a standard is included in the Examples Section of this disclosure.

EXAMPLES

Lithium aluminum titanium phosphate (LATP) solid ceramic electrolytes were prepared by solid state processes. Ammonium phosphate, aluminum oxide, titanium oxide and lithium carbonate powders were mixed in a stoichiometric ratio to produce $Li_{1.4}Al_{0.4}Ti_{1.6}(PO_4)_3$. The powder batch was calcined for 2 hours at 700° C. The resulting material was milled to an average particle size of about 10 μm and then calcined again for 2 hours at 700° C. The resulting material was then milled to ~0.3 μm average particle size in a solvent. Suitable solvents include ethanol, butanol and propylene glycol, which may be optionally combined with a dispersant such as Phospholan 236 (commercially available from AkzoNobel N.V. of Amsterdam, Netherlands).

Membrane samples were prepared using various additives, which may act as grain growth inhibitors in some samples. Samples were also prepared with no additives. In the case of an additive being used, 3-6 mol % of an additive was added to the LATP batch. A polymer such as polyvinyl butyral (PVB) was added to make a slip. The slip was tape cast with 14-18 mil blades. It was dried for 2-12 hours at room temperature and released from the carrier film. The resulting green body was then fired to density at various sintering temperatures with a 400° C. hold for 1 hour to burn out the green tape polymer binder. The fired membranes were 50-150 μm thick.

Figure 2:
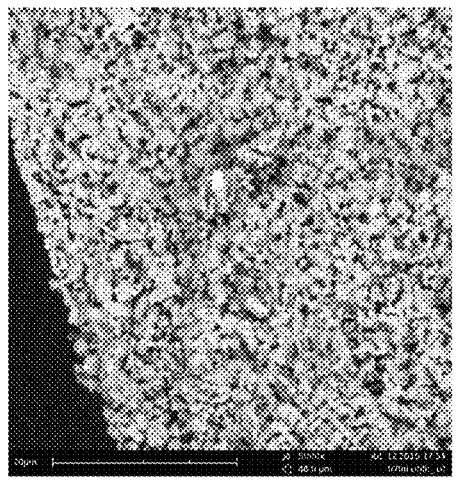
FIG. 2 shows a cross-sectional SEM image of a comparative tape cast LATP material with no grain growth inhibitor fired at 950° C. for 2 hours with no pressure.

SEM images for the samples showed approximate density and grain size of the samples. FIG. 2 shows an SEM image of a cross section of a comparative tape cast LATP with no additive fired at 950° C. for 2 hours with no pressure. Sample shows poor sintering and significant porosity with poor mechanical stability. The average grain size was greater than 2 microns.

Figure 3:
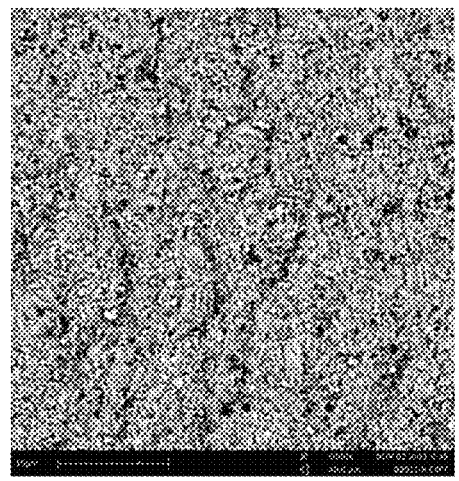
FIG. 3 shows a cross-sectional SEM image of a tape cast LATP material having magnesia and titania as a grain growth inhibitor.

FIG. 3 shows an SEM image of a cross section of tape cast LATP with an additive of magnesia and titania that acted as a grain growth inhibitor (titania:magnesia ratio of 2:1 to 4:1) fired at 900° C. (by ramping temperature to 900° C. and then cooled to room temperature by reducing temperature by 10° C./min from 900° C.) with no pressure. Sample shows good sintering and high density with good mechanical stability. The average grain size was less than or equal to 2 microns.

Figure 4:
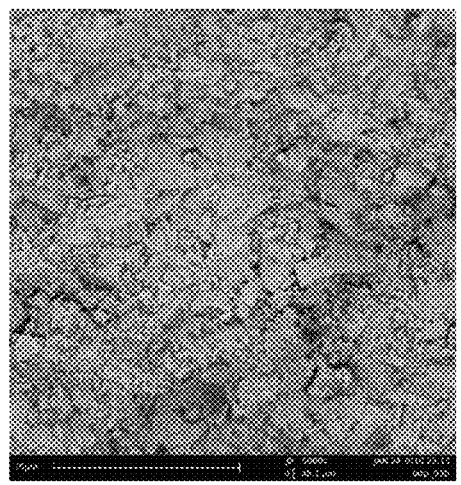
FIG. 4 shows a cross-sectional SEM image of a comparative tape cast LATP material with phosphoric acid as a grain growth inhibitor fired at 900° C. for 2 hours with no pressure.

FIG. 4 shows an SEM image of a cross section of a comparative tape cast LATP with phosphoric acid as an additive fired at 900° C. for 2 hours with no pressure. Sample shows good sintering and high density with poor mechanical stability. The average grain size was greater than 2 microns.

Figure 5:
FIG. 5 shows a cross-sectional SEM image of a comparative tape cast LATP material with lithium nitrate as a grain growth inhibitor fired at 900° C. for 2 hours with no pressure.

FIG. 5 shows an SEM image of a cross section of a comparative tape cast LATP with lithium nitrate as an additive fired at 900° C. for 2 hours with no pressure. Sample shows good sintering and high density with poor mechanical stability. The average grain size was greater than 2 microns.

Figure 6:
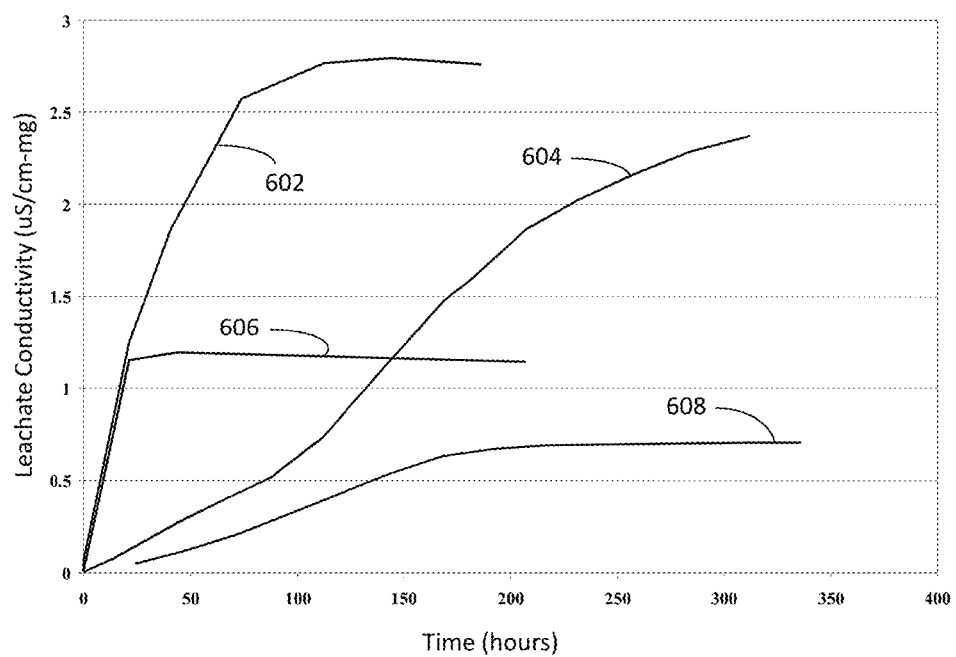
FIG. 6 shows leachate conductivity as a function of time for ceramic electrolyte samples with various additives.

Samples were tested for their physically stability when in contact with an aqueous solution using two testing methods. In the first testing method, fired solid ceramic electrolyte samples were tested by submerging weighed pieces of the solid ceramic electrolyte in de-ionized water. The conductivity of the de-ionized water was measured daily and the data was normalized per mg of sample (μS/cm-mg). Higher conductivity corresponded to decreased stability in aqueous solutions, as solid ceramic electrolyte dissolved into the de-ionized water which increased conductivity. FIG. 6 shows conductivity results for samples with various additives (lithium nitrate, lithium borate, phosphoric acid, magnesia and titania) over a period of time. The data in FIG. 6 is represented in a plot of leachate conductivity in μS/cm-mg versus time in hours. The sample that utilized magnesia and titania as an additive showed the best water stability. The results are summarized below in Table 1.

The second testing method was a one-side aqueous solution stability test. LATP solid ceramic electrolytes with various additives were prepared as described herein. A piece of the each sample LATP solid ceramic electrolyte membrane was attached to the end of a glass tube with a water resistant epoxy. This allows only one side of the solid ceramic electrolyte to be exposed to the aqueous test solution. The tube was filled with the test solution and suspended over a catch cup. In this case, 1 M ammonium chloride test was used to fill the tube as the aqueous solution. The solid ceramic electrolyte membrane was monitored for leaks or mechanical failure hourly for about 8 hours. After the first 8 hours the membrane was checked daily for failure and observations are recorded in Table 1. The samples made without sintering aids were too porous for this test. The samples made with lithium nitrate or lithium borate were too fragile to mount for this test. Samples made with LATP and phosphoric acid failed in less than 24 hours exposure. Samples made with LATP and magnesia and titania survived over 6000 hours of one sided exposure.

TABLE 1

Stability data for various ion-conductive ceramic membranes

| Material (Ion-Conducting Ceramic + Additive) | FIG. 6 Reference No. | Stability duration | Physical stability when in contact with an aqueous solution |
|---|---|---|---|
| LATP (no additive) | N/A | N/A | Poor |
| LATP + lithium nitrate | 602 | N/A | Poor |
| LATP + lithium borate | 604 | N/A | Poor |
| LATP + phosphoric acid | 606 | <24 hours | Poor |
| LATP + magnesia + titania | 608 | >6000 hours | Good |

As used herein, the singular forms "a," "an" and "the" include plural referents unless the context clearly dictates otherwise. Thus, for example, reference to a "additive" includes examples having two or more such "additive" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

I claim:

1. A solid ceramic electrolyte consisting of an ion-conducting ceramic and a grain growth inhibitor, wherein:
   the ion-conducting ceramic consists of a lithium metal phosphate compound;
   the grain growth inhibitor is selected from the group consisting of magnesia, titania, and a mixture of magnesia and titania;
   the solid ceramic electrolyte is substantially free of glass, glass-ceramic and polymer phases;
   the solid ceramic electrolyte is physically stable when in contact with an aqueous solution for at least about 24 hours; and
   the grain growth inhibitor comprises between about 0.5 mol. % to about 10 mol. % of the solid ceramic electrolyte.

2. The solid ceramic electrolyte of claim 1, wherein the grain growth inhibitor consists essentially of titania.

3. The solid ceramic electrolyte of claim 1, wherein the grain growth inhibitor consists essentially of magnesia.

4. The solid ceramic electrolyte of claim 1, wherein the grain growth inhibitor comprises titania and magnesia.

5. The solid ceramic electrolyte of claim 4, wherein a molar ratio of titania to magnesia (titania:magnesia) is between about 2:1 to about 8:1.

6. The solid ceramic electrolyte of claim 1, wherein the grain growth inhibitor comprises between about 3 mol. % to about 6 mol. % of the solid ceramic electrolyte.

7. The solid ceramic electrolyte of claim 1, wherein the solid ceramic electrolyte has an ion conductivity of at least about $1 \times 10^{-4}$ S/cm.

8. The solid ceramic electrolyte of claim 1, wherein the lithium metal phosphate compound is lithium aluminum titanium phosphate (LATP).

9. The solid ceramic electrolyte of claim 1, wherein the lithium metal phosphate compound is $Li_{1+x}Al_xTi_{2-x}(PO_4)_3$, where x is between 0 and 0.6.

10. The solid ceramic electrolyte of claim 1, wherein a thickness of the solid ceramic electrolyte is less than about 200 microns.

11. The solid ceramic electrolyte of claim 1, wherein a density of the solid ceramic electrolyte is at least 95% of a theoretical maximum density of the solid ceramic electrolyte.

12. A method of forming the solid ceramic electrolyte of claim 1, the method comprising:
    combining an ion-conducting ceramic with at least one grain growth inhibitor to form a mixture, wherein the ion-conducting ceramic comprises a lithium metal phosphate compound and the grain growth inhibitor is selected from the group consisting of magnesia, titania, a magnesia precursor and a titania precursor;
    casting the mixture to form a body; and
    sintering the body to form the solid ceramic electrolyte.

13. The method of claim 12, wherein a sintering temperature is equal to or less than about 950° C.

14. The method of claim 12, wherein the casting comprises tape casting.

15. The method of claim 12, wherein the body comprises a binder, a plasticizer, or both.

16. The method of claim 12, wherein the ion-conducting ceramic has an average particle size of less than about 1 micron.

17. An electrochemical device comprising a negative electrode, a positive electrode, and an interposed electrolyte material, wherein
the electrolyte material comprises the solid ceramic electrolyte of claim 1.

18. The electrochemical device of claim 17, wherein a thickness of the solid ceramic electrolyte is less than about 200 microns.

19. The electrochemical device of claim 17, wherein the electrochemical device is a lithium-air battery.

* * * * *